Feb. 13, 1945.   J. R. LAWLER   2,369,242
HEATING SYSTEM
Filed April 20, 1944
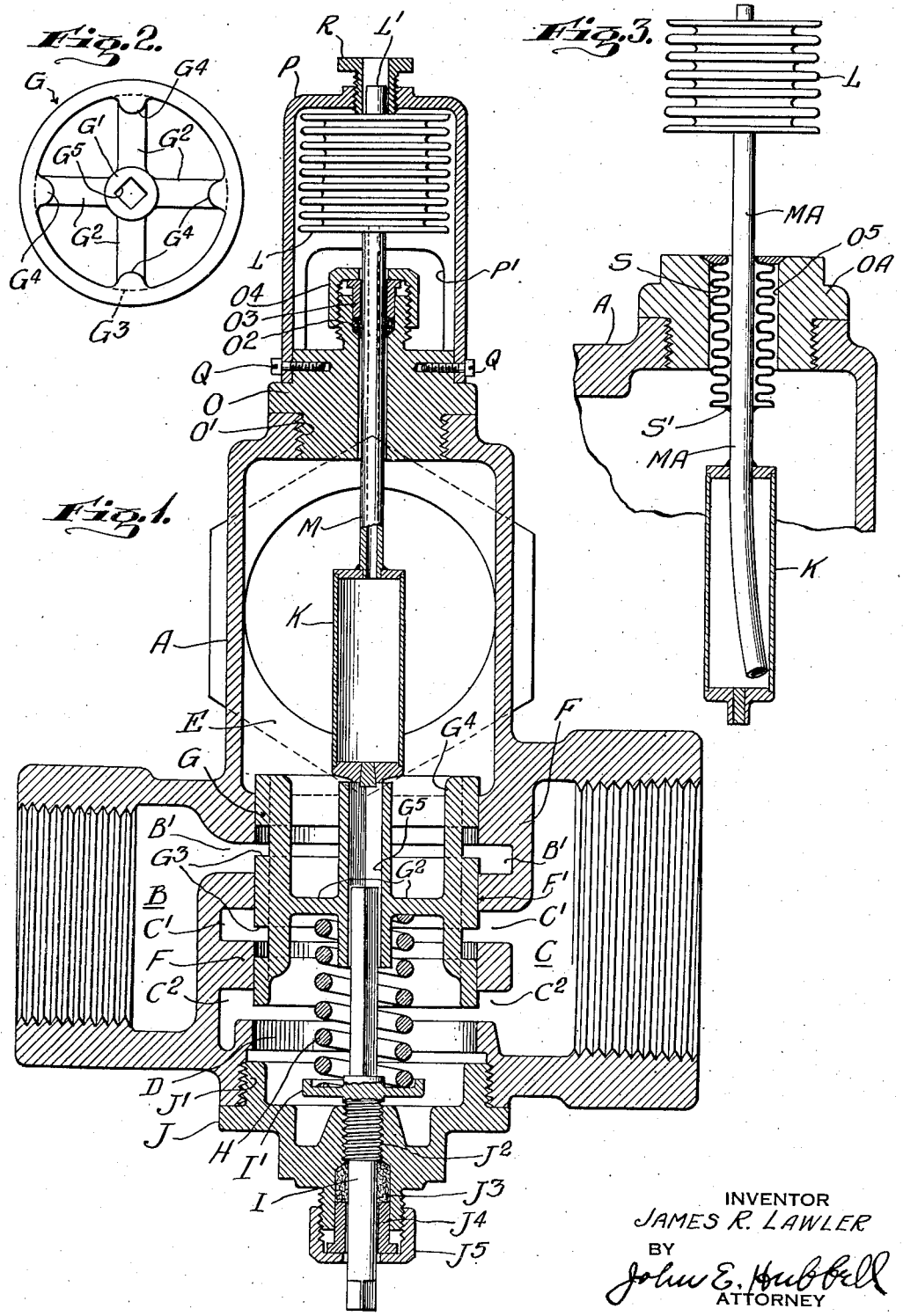
INVENTOR
JAMES R. LAWLER
BY
John E. Hubbell
ATTORNEY Patented Feb. 13, 1945

2,369,242

UNITED STATES PATENT OFFICE 2,369,242

HEATING SYSTEM

James R. Lawler, Pelham, N. Y., assignor to Lawler Automatic Controls, Mount Vernon, N. Y., a copartnership composed of James R. Lawler and Raymond C. Smith Application April 20, 1944, Serial No. 531,891

1 Claim. (Cl. 236—12)

The present invention relates to thermostatic tempering valves of the known type commonly employed to mix hot and cold water supplied through separate inlets to a mixing chamber in the valve casing, and comprising a mixing valve mechanism automatically adjusted by thermostatic means responsive to the mixture temperature for the purpose of maintaining that temperature approximately constant.

The general object of the present invention is to provide an improved thermostatic tempering valve of the above mentioned type.

A major object of the invention is to provide such a tempering valve with simple and effective thermostatic adjusting means comprising a bellows or other expansible element which is located outside of the valve casing or body, and hence out of injurious contact with the fluid passing through said body, but which is subjected to the fluid pressure in a thermometer bulb element located in said mixing chamber.

A more specific object of the invention is to combine the thermostatic mechanism parts in a simple mechanical unit separable from the mixing valve mechanism and adapted to be separately disconnected from the valve casing when necessary or desirable for cleaning, inspection or repair purposes.

A further object of the invention is to provide a valve structure including a piston type valve member normally adjustable only in a longitudinal direction with simple and effective means for effecting small angular adjustments of the valve member in its seat, to minimize or correct for the tendency of the valve to stick in its seat.

A further object of the invention is to combine the valve member and associated supporting and biasing parts so that they may be readily removed from the valve casing without disturbance of the thermostatic valve adjusting means.

The various features of novelty which characterize my invention are pointed out with particularity in the claim annexed to and forming a part of this specification. For a better understanding of the invention, however, its advantages, and specific objects attained by its use, reference should be had to the accompanying drawing and descriptive matter in which I have illustrated and described preferred embodiments of the invention.

Of the drawing:

Fig. 1 is a sectional elevation of a tempering valve;

Fig. 2 is a plan view of the mixing valve member shown in Fig. 1; and

Fig. 3 is a sectional elevation, taken similarly to Fig. 1, and illustrating a modification.

The tempering valve shown in Figs. 1 and 2 comprises a valve body or casing A formed with cold and hot fluid chambers B and C, respectively, at opposite sides of a cylindrical valve chamber D. The valve body also includes a mixing chamber E at one end of and in free communication with the valve chamber D. The latter is shown as adapted to communicate with the inlet chamber B through a port $B^1$, and to communicate with the inlet chamber C through ports $C^1$ and $C^2$ although only one of said ports is essential. The ports $B'$, $C'$ and $C^2$ are formed in a partition wall portion F of the valve casing which surrounds the valve chamber D. The internal cylindrical surface of the wall F forms a seat $F'$ for a mixing valve member G. The valve body A is formed with openings and pipe attachment provisions of the usual type for the connection of pipes supplying hot and cold water or other fluids to the chambers B and C, and for the outflow from the mixing chamber E of the fluid mixture formed.

The valve member G, in the desirable form shown, comprises a cylindrical body portion fitting snugly in the seat $F'$, a central hub-like portion $G'$ and arms $G^2$ connecting said hub portion to the cylindrical body portion of the valve member. Circumferentially extending ports $G^3$ are formed in the cylindrical body. In the desirable form illustrated, each arm $G^2$ is integrally connected at its outer end to an internal, longitudinally extending, rib portion $G^4$ of the valve member, located at the inner side of the cylindrical inner surface of the portions of the body of the valve member between the adjacent ribs $G^4$. This permits each of the ports $G^3$ to be formed in the valve body by turning lathe operation.

In the construction shown, the valve member G is biased for axial movement toward the mixing chamber E by a helical compression spring H coaxial with the valve member and acting between the ribs $G^2$ and an abutment flange $I'$ on a coaxial adjusting rod or plunger I. The latter comprises a lower portion mounted in and extending through a removable movable casing element J. The element J, as shown, comprises an externally threaded nipple portion $J'$ normally screwed into a valve casing opening coaxial with the valve chamber D. The member J is formed with a central passage having its inner end portion internally threaded at $J^2$ for threaded engagement with a corresponding externally threaded portion of the adjusting rod I. The outer end of the central passageway in the member J is enlarged to form a stuffing-box chamber J³ through which the rod I extends and in which it is surrounded by packing material compressed by a gland member J⁴. As shown, the outer end of the gland member is normally surrounded by a stuffing-box nut or cap member J⁵.

In accordance with the present invention, the inner portion of the adjusting rod I is in splined engagement with the valve member G. The splined engagement is obtained, as shown, by making the inner end portion of the rod I polygonal in cross-section and extending loosely but non-rotatably into an axial passageway G⁵ in the hub portion of the valve member, which is similarly polygonal in cross-section.

The tendency of the spring H to move the valve member G toward the mixing chamber E is opposed and controlled by the thermometer bulb or non-expansible capsule K within the mixing chamber E, an expansible bellows element L external to the valve casing, and a tube or hollow rod M. The latter forms a strut mechanically connecting the adjacent ends of the bulb K and bellows L, and also forms a conduit connection between the interior of the bulb and the interior of the bellows. Preferably, and as shown, the parts K, L and M are all coaxial with the valve member G. One end of the bulb member K is in abutting engagement with the hub G of the valve member and the members K and M collectively form a valve adjusting plunger through which the expansion and contraction of the bellows L moves the valve member G in one direction, or permits it to move in the opposite direction under the action of the bias spring H.

The hollow rod M extends through a central passage in a removable valve casing part O which, as shown, comprises an externally threaded nipple portion O' screwed into an opening in the valve casing or body A at the outer end of the mixing chamber E. The casing O is formed at its outer side with a stuffing-box O² through which the rod M extends and in which it is surrounded by packing material compressed by a gland member O³. As shown, the gland member O³ is surrounded by a casing nut O⁴.

The bellows element L is mounted in a tubular casing element P which has one open end surrounding a cylindrical portion of the member O and detachably secured to the latter by screws Q. At its opposite end the casing member P is closed, except for a central aperture, to provide an abutment for the normally stationary outer end wall of the bellows L. Advantageously though not necessarily that abutment is adjustable. As shown, the abutment is formed by a tubular externally threaded part R adjustably mounted in a threaded opening in the outer end wall of the casing element P. The outer end wall of the bellows L is formed with a centering projection L' extending into the bore of the abutment member R. The casing element P is formed with one or more lateral openings P' through which the outer surface of the element L is in free contact with the atmosphere.

In the normal use of the valve mechanism shown in Figs. 1 and 2, the members I and R are axially adjusted in their respective threaded supports so as to maintain the fluid temperature in the mixing chamber E approximately constant at a desired value notwithstanding considerable variations in the temperatures of the fluids passing through the inlet chambers B and C. The thermometer fluid in the bulb K, bellows L and tube M may vary in composition and in its pressures when the bulb is at different temperatures, in accordance with the conditions of use and the customary practice of the art. In some cases, the thermostatic fluid may consist wholly or mainly of water and water vapor.

With the bellows element L mounted outside of the valve body, as shown, that element which ordinarily is made of very thin tempered metal, is protected against corrosive contact with the fluid passing through the valve, and is also protected against the temperature shock or extremely rapid changes in temperatures to which it might be subjected from time to time if located within the mixing chamber, as has been the usual practice in the art heretofore. The thermometer bulb K may be made of metal of such composition and thickness as to be largely immune to injury from corrosion or temperature shock.

The thermostatic mechanism unit comprising the member O and the parts mounted on and supported thereby, is characterized by its mechanical simplicity, and by the ease with which it may be detached from the valve body for inspection, cleaning or repair purposes whenever desirable. The removal of the casing P makes the bellows element and adjacent stuffing-box accessible for cleaning and adjustment. While the ends of the tubular element M will ordinarily be brazed to the bulb K and to the movable end wall L³ of the bellows L, it is a relatively simple matter to separate the tube from the bellows or bulb when this becomes necessary, as will rarely be the case.

The valve mechanism unit comprising the valve member G, bias spring H, rod I and casing wall part J may be readily separated from the valve body whenever the occasion arises, and when removed gives ample access to the valve seat F'', for inspection, cleaning, or regrinding if necessary. With a suitably fine threaded connection the rod I and member J, a slight angular adjustment may be given to the rod and thereby to the valve member splined to the rod, so as to minimize the occasional tendency of the valve to stick in its seat, without significantly effecting the bias force to which the valve is subjected by the spring H.

Under normal operating conditions, the valve member G will occupy an intermediate longitudinal position in which the ports through which the hot and cold fluids pass from the supply chambers B and C into the valve chamber E are all partly open and partly obstructed by the valve member, generally as shown in Fig. 1. When the temperature of the mixture in the chamber E increases above normal the corresponding increase in the temperature of the bulb K results in an increase in the volume of the thermostatic fluid in the bulb K, tube M and bellows L. The resultant expansion of the bellows L gives a down movement to the valve member G and thereby increases the port area through which cold fluid flows into the valve chamber through the port B¹, and simultaneously decreases the free port areas for the flow of hot fluid into the valve chamber from the hot fluid supply chamber C through the ports C' and C². This lowers the mixture temperature in the chamber E.

Conversely, when the temperature in the chamber E falls below normal, the reduction in the temperature of the bulb K results in a reduction in the volume of the thermostatic fluid and a contraction of the bellows L. This permits the valve member G to move toward the chamber E under the action of the bias spring H, thereby decreasing the cold fluid flow through the port B¹ and increasing the hot fluid flow through the port C¹ and C².

With the parts suitably constructed, the frictional resistance to the movement of the rod M through the stuffing-box O² ordinarily will not be practically objectionable. However, such resistance to the movement of the valve member in response to changes in mixing temperature may be avoided by the use of the arrangement shown in Fig. 3, wherein the member O is replaced by a member OA. The latter differs from the member O in that it includes no stuffing-box parts, and in that its central passageway O⁵ is made large enough to receive a bellows joint sealing element S through which the hollow rod MA passes. The inner end of the bellows element S is closed and is brazed at S' to the tube member. The outer end of the bellows S is open, and is brazed or otherwise anchored to the member OA. The tubular member MA differs from the member M of Fig. 1 in that it extends down into the lower liquid filled, portion of the bulb.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claim, and that in some cases certain features of my invention may be used to advantage without a corresponding use of other features.

Having now described my invention, what I claim as new and desire to secure by Letters Patent is:

In combination, a valve casing enclosing and forming a wall for a mixing chamber and formed with hot and cold fluid inlets to said chamber and with a passage through said wall, valve means adjustable in one direction to increase flow through one and to decrease flow through the other of said inlets and adjustable in the opposite direction to increase flow through the other of said inlets and to decrease flow through said one inlet, a bias spring tending to adjust said valve means in one direction and thermostatic valve adjusting mechanism for adjusting said valve means comprising a non-expansible fluid container in said mixing chamber, an expansible fluid container external to said casing and a tubular element extending through said passage and mechanically connecting said containers and forming a conduit through which the fluid containing spaces of said containers are in communication, and uniting with said non-expansible container to form a plunger through which said expansible container operates on its expansion and contraction to adjust said valve means in one direction and to restrict its adjustment in the opposite direction by said bias spring and a rotatable element extending into said casing and in splined engagement with said valve means and adapted by its rotation to vary the position of said valve means and thereby minimize the tendency of said valve means to stick.

JAMES R. LAWLER.